US00RE38917E

(19) United States
(12) Reissued Patent
Ardes

(10) Patent Number: US RE38,917 E
(45) Date of Reissued Patent: Dec. 13, 2005

(54) FLUID FILTER WITH FILTER BYPASS VALVE AND SEALING SURFACE ON FILTER ELEMENT SIDE

(75) Inventor: Wilhelm Ardes, Ascheberg (DE)

(73) Assignee: Firma Ing. Walter Hengst GmbH & Co. KG, Münster (DE)

(21) Appl. No.: 09/561,787

(22) Filed: Apr. 28, 2000

Related U.S. Patent Documents

Reissue of:
(64) Patent No.: 5,770,054
Issued: Jun. 23, 1998
Appl. No.: 08/617,472
Filed: Mar. 15, 1996

(30) Foreign Application Priority Data

Mar. 16, 1995 (DE) ..... 195 09 566
Feb. 14, 1996 (DE) ..... 196 05 425

(51) Int. Cl.[7] ..... B01D 35/147
(52) U.S. Cl. ..... 210/130; 210/430; 210/440; 210/441; 210/454; 210/457; 210/497.01; 29/428
(58) Field of Search ..... 210/130–132, 210/137, 430, 431, 440, 441, 443, 444, 454, 457, 493.1, 493.2, 497.01, 767

(56) References Cited

U.S. PATENT DOCUMENTS 2,533,266 A * 12/1950 Kovacs et al. ..... 210/183
2,693,281 A * 11/1954 Winzen ..... 210/493.2
3,295,680 A * 1/1967 Wilber ..... 210/493.1
3,333,703 A * 8/1967 Scavuzzo et al. ..... 210/232
3,807,561 A * 4/1974 Cullis ..... 210/130
4,906,365 A * 3/1990 Baumann et al. ..... 210/238
5,066,391 A * 11/1991 Faria ..... 210/85
5,374,355 A * 12/1994 Habiger et al. ..... 210/440
5,538,626 A * 7/1996 Baumann ..... 210/130

FOREIGN PATENT DOCUMENTS

DE 3904701 A1 8/1990
DE 4214500 A1 11/1993
DE 4310234 C1 8/1994
EP 0254776 B1 3/1991
GB 526736 9/1940 ..... 210/DIG. 17

* cited by examiner

*Primary Examiner*—Matthew O. Savage
(74) *Attorney, Agent, or Firm*—Lahive & Cockfield, LLP; Anthony A. Laurentano, Esq.

(57) ABSTRACT

In a fluid filter with a housing and a filter element replaceably located in said housing, and with a filter by pads valve having a valve body held in the housing that is movable against the action of a spring from the closed position in which it cooperates with a sealing surface, into an open position in which it permits a fluid flow to bypass the filter element. The invention proposes that the sealing surface associated with the valve body be formed by the replaceable filter element.

35 Claims, 3 Drawing Sheets

Amended

Amended

Amended

FLUID FILTER WITH FILTER BYPASS VALVE AND SEALING SURFACE ON FILTER ELEMENT SIDE

Matter enclosed in heavy brackets [ ] appears in the original patent but forms no part of this reissue specification; matter printed in italics indicates the additions made by reissue.

BACKGROUND OF THE INVENTION

The present invention relates to a fluid filter according to the preamble of claim 1.

Filters of this type are known for example from DE 42 14 500 A1 and U.S. Pat. No. 2,533,266. DE 42 14 500 A1 has a much more economically manufactured filter than the older U.S. Pat. No. 2,533,266. However, installation of the filter bypass valve is comparatively complicated since the sealing body of the valve must be guided together with a sealing body carrier through nearly the entire length of a supporting dome and then anchored in the supporting dome. Both of the above patents teach valves with a sealing body that has an elongate shaft.

A fluid filter of a different species is known from DE 43 10 234 C1, in which the entire filter bypass valve is provided inside the replaceable filter element, with the filter bypass valve comprising a sealing body made in the form of a circular disk.

Fluid filters that do not belong to the foregoing species are known from EP 0 254 776 B 1 and DE 39 04 701 A1. These filters typically do not include any replaceable filter elements, and are themselves replaced completely, i.e. including the entire filter housing.

The goal of the invention is to improve on a fluid filter according to the foregoing species in such fashion that the manufacturing costs of the filter are lowered by reducing the number of parts and assembling them as economically as possible.

SUMMARY OF THE INVENTION

This goal *that* forms the basis of the invention is achieved by making the filter bypass valve in two parts as filter-integral parts that also include the valve body, while the sealing surface associated with the valve body is not integral with the filter, but is provided on the replaceable filter element. This design makes it possible to reduce the number of parts required, while the filter-integral components of the filter bypass valve are provided in an optimally accessible location and are installed from the valve body side, since in this simplified assembly process, the entire filter bypass valve is not completed until the filter element is installed.

In the fluid filter design with an annular filter element, a supporting dome can advantageously be provided in the middle of the filter element, with the supporting dome remaining integral with the filter. The supporting dome prevents the filter element from collapsing, so that it can be made of economical materials whose mechanical strength is reduced during operation of the filter. The supporting dome offers a simple and economical way to support the filter body.

Advantageously, a change in cross section can be provided in the supporting dome that forms a supporting plate which the spring associated with the valve body abuts, with such a spring being designed for example as a coil spring. The supporting plate can advantageously be molded on the supporting mandrel, so that a single part is created that can be manufactured economically.

When a supporting dome is used, an end disk of the filter element, which is required in any event for design reasons, can be used to form the sealing surface, so that no additional parts are required, with the additional seal required in known fluid filters according to the species and located between the dirty and the clean sides being unnecessary, since it is formed by the filter bypass valve.

The filter bypass valve can be designed in various ways. Thus for example it is possible to design the valve body as a plate that is pressed by the spring against an opening provided in the end disk of a replaceable filter element. A plurality of openings arranged in a circle may be provided in this end disk, so that the plate can have an internal bore for example and be made as an annular plate to save material, said plate being pressed by the spring against the openings. In any event, the flat valve body is advantageously fastened permanently to the spring, so that when the filter element is replaced, assurance is provided that the valve body is in the correct position when the new filter element is installed.

Designing the valve body as a plate or annular disk represents a material-saving and hence economical design for the valve body. However, the functional reliability of the filter bypass valve can be ensured and improved by providing the valve body with an elongated shaft to guide the valve body during its opening and closing movements.

Basically, it is possible to design the valve body in the form of a bolt so that its end can seal an opening provided in the end disk of the replaceable filter element. The valve body can be centered by virtue of the fact that its end which cooperates with the sealing surface is made frustoconical, conical, or rounded convexly, particularly with a round area in the form of a section of a sphere providing a seat on the sealing element that always remains effective even when the valve body is in a slightly diagonal position. A large aperture cross section of the valve can be produced by a mushroom-shaped valve body design.

Advantageously, when designing a supporting plate provided in the supporting dome for the spring, the supporting plate can improve the guiding function of the shaft of a mushroom-shaped valve body, with the supporting plate being made annular and extending around the shaft of the valve body.

Guidance of this design on a supporting plate can be reinforced by a greater thickness of the supporting plate at its inner edge, so that a greater guiding length is obtained for the shaft of the valve body.

BRIEF DESCRIPTION OF THE DRAWING

The invention will now be described in greater detail with reference to the drawings.

DESCRIPTION OF ILLUSTRATED EMBODIMENTS

Figure 1:
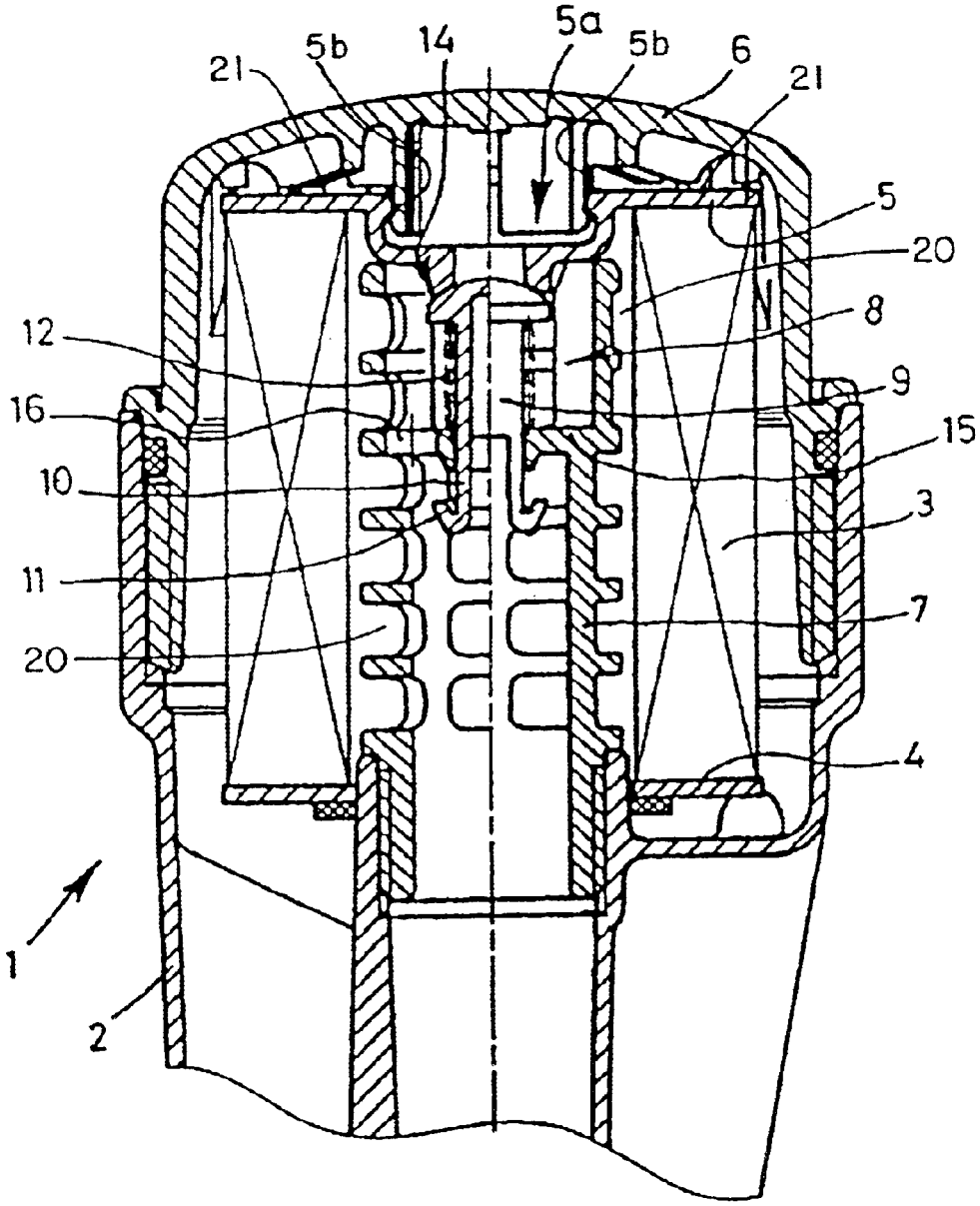
FIG. 1 is a first embodiment of a fluid filter in the assembled state.

In FIG. 1, the numeral 1 generally designates a fluid filter comprising a carrier 2, which can be screwed onto an associated assembly, for example an internal combustion engine.

Carrier 2 forms a part of the filter housing itself. A filter element 3, a folded filter element for example, is replaceably located in the filter housing, the element 3 being annular and including a lower end disk 4 and an upper end disk 5. A lid 6 screwed onto carrier 2 forms the removable second part of the filter housing and permits filter element 3 to be replaced.

Filter element 3 is supported internally by a supporting dome 7 *located in a recess 20 sufficiently sized for seating the supporting dome 7* that prevents filter element 3 from collapsing and allows filter element 3 to have a design that includes only the folded filter surface itself and the two end disks 4 and 5. A filter bypass valve 8 is located in the upper part of supporting dome 7. This valve includes a mushroom-shaped valve body 8 with a head area and a shaft 9, said shaft forming spring-elastic tongues in its lower part, said tongues having gripping claws 11 directed radially outward and bent backward barbwise.

By virtue of this design, the entire fluid filter can be manufactured economically: a comparatively small number of parts is used, since no separate valve body support is required. Assembly is also facilitated and can be performed in a shorter time since the valve body can be inserted from the readily accessible upper end of supporting dome 7 and need not be inserted through nearly the entire length of supporting dome 7. Since valve body 8 does not have to be located behind a sealing surface, an easily accessible mounting location of this kind is possible.

Shaft 9 is surrounded areawise by a coil spring 12, merely indicated by shading, which contacts the head area of valve body 8 and presses upward against a sealing surface 14 formed by a middle area 5a of upper end disk 5 that tapers downward.

[Coil] *A resistance element, in the form of coil* spring 12, abuts a support plate 15 having at least one through opening 16 for the medium when the latter, with the filter bypass valve open, flows through a central opening of middle area 5a of downwardly tapered upper end disk 5 and flows downward through supporting dome 7, or when this medium, with the filter bypass valve closed, moves from the outside to the inside through filter element 3 and flows downward after being filtered.

In its middle edge area adjacent to the opening through which valve body 8 extends, supporting plate 15 has a greater material thickness. For this purpose, supporting plate 15 is bent downward flangewise, i.e. in the direction away from sealing surface 14.

As a result of this material reinforcement, a guide is provided for valve body 8, since its shaft 9 is guided for a comparatively greater length. In addition, reinforcement of the material in this area results in stabilization of supporting plate 15 at the points where coil spring 12 abuts it. Finally, this flange-shaped material reinforcement offers a grip for barbed retaining claws 11 that can grip behind the flange, so that valve body 8 is securely fastened even when filter element 3 is removed and the counterpressure for the upper head portion of valve body 8 is removed as a result.

Valve body 8 can initially be fitted with coil spring 12 and then inserted from above into supporting dome 7, with the conically shaped outer surface of retaining claws 11 initially permitting easy insertion of valve body 8 into the central opening of supporting plate 15, thus permitting valve body 8 to be clipped to supporting dome 7. Valve body 8 can be assembled in this fashion in a very short time since no additional prefabricated assemblies, possibly with a separate valve body support, need to be produced or assembled, and since the installation location and supporting dome 7 are optimally accessible and reachable.

Depending on the installation situation, in contrast to using a separate valve carrier, the height of the filter device can be reduced as well so that a more compact design for the entire fluid filter 1 is obtained overall. This means both that material can be saved and that there are more installation possibilities, for example under restricted space conditions like those prevailing in the engine compartment of an automobile.

Figure 2:
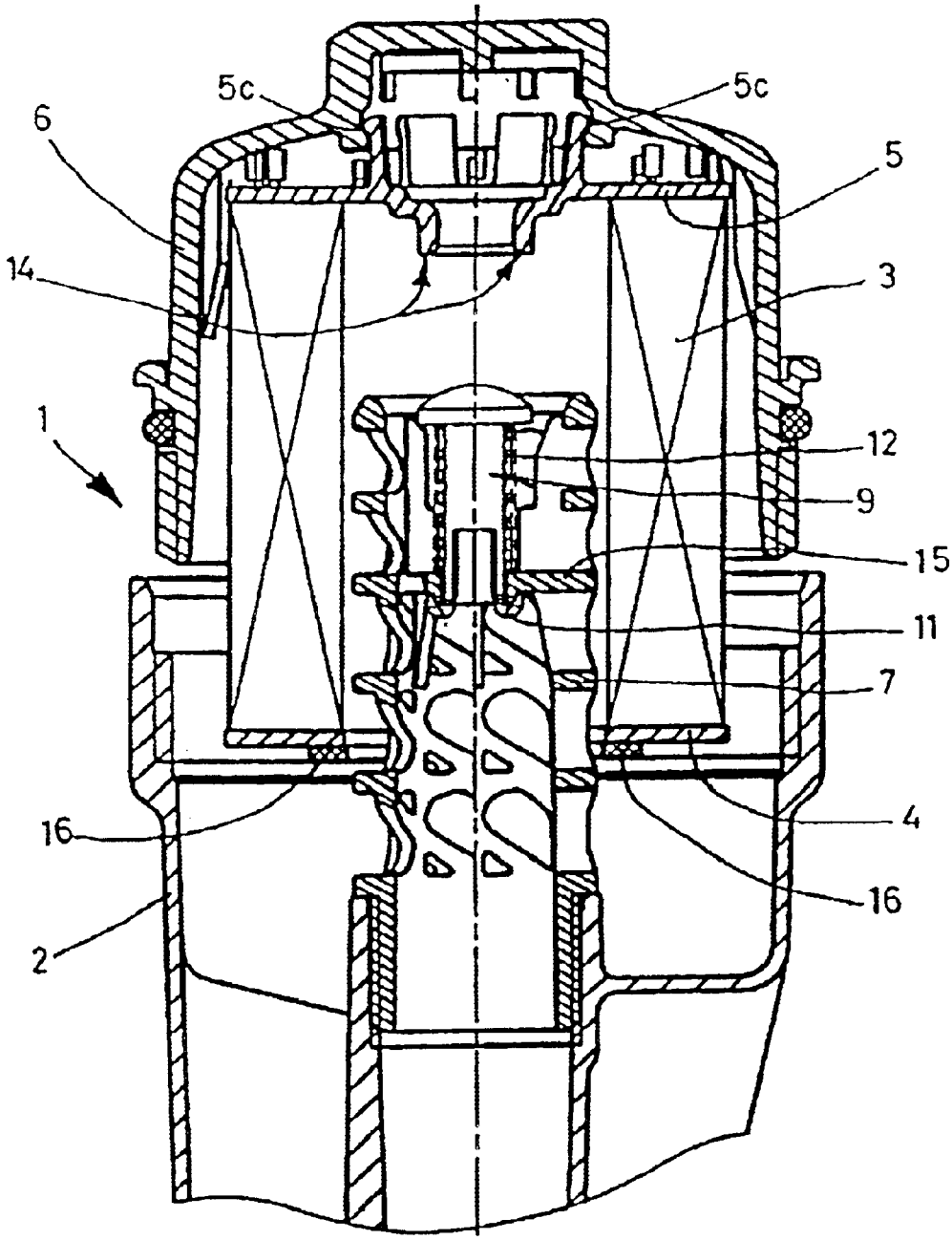
FIG. 2 is an embodiment similar to FIG. 1, with the filter element partially removed.

FIG. 2 shows the design of a fluid filter comparable with FIG. 1, but with cover 6 unscrewed from support 2. Filter element 3 is connected with lid 6 by clips formed on *a housing engaging surface 21 of* its upper end disk 5, so that when lid 6 is unscrewed, filter element 3 is also removed from carrier 2 and hence from supporting dome 7. In contrast to FIG. 1, lid 6 in FIG. 2 is in a raised position so that upper end disk 5 of filter element 3 is also lifted off the upper end of supporting dome 7. As a result of spring 12 abutting supporting plate 15, when lid 6 is unscrewed valve body 8 is raised as well until retaining claws 11 strike supporting plate 15, so that despite removal of sealing surface 14, valve body 8 is connected permanently and integrally with the filter.

An annular seal is located on lower end disk 4, the seal in FIG. 2 abutting the central tube of carrier 2 in a sealing fashion and sealing off the dirty side from the clean side of fluid filter 1. This seal has no function in FIG. 2 because filter element 3 is raised. A seal comparable with this seal 16 which could be provided on the upper end disk of filter element 3 is not required in the design of fluid filter 1 according to the invention since this sealing effect is provided by the filter bypass valve, so that the material and cost savings made possible by the invention are supported.

Figure 3:
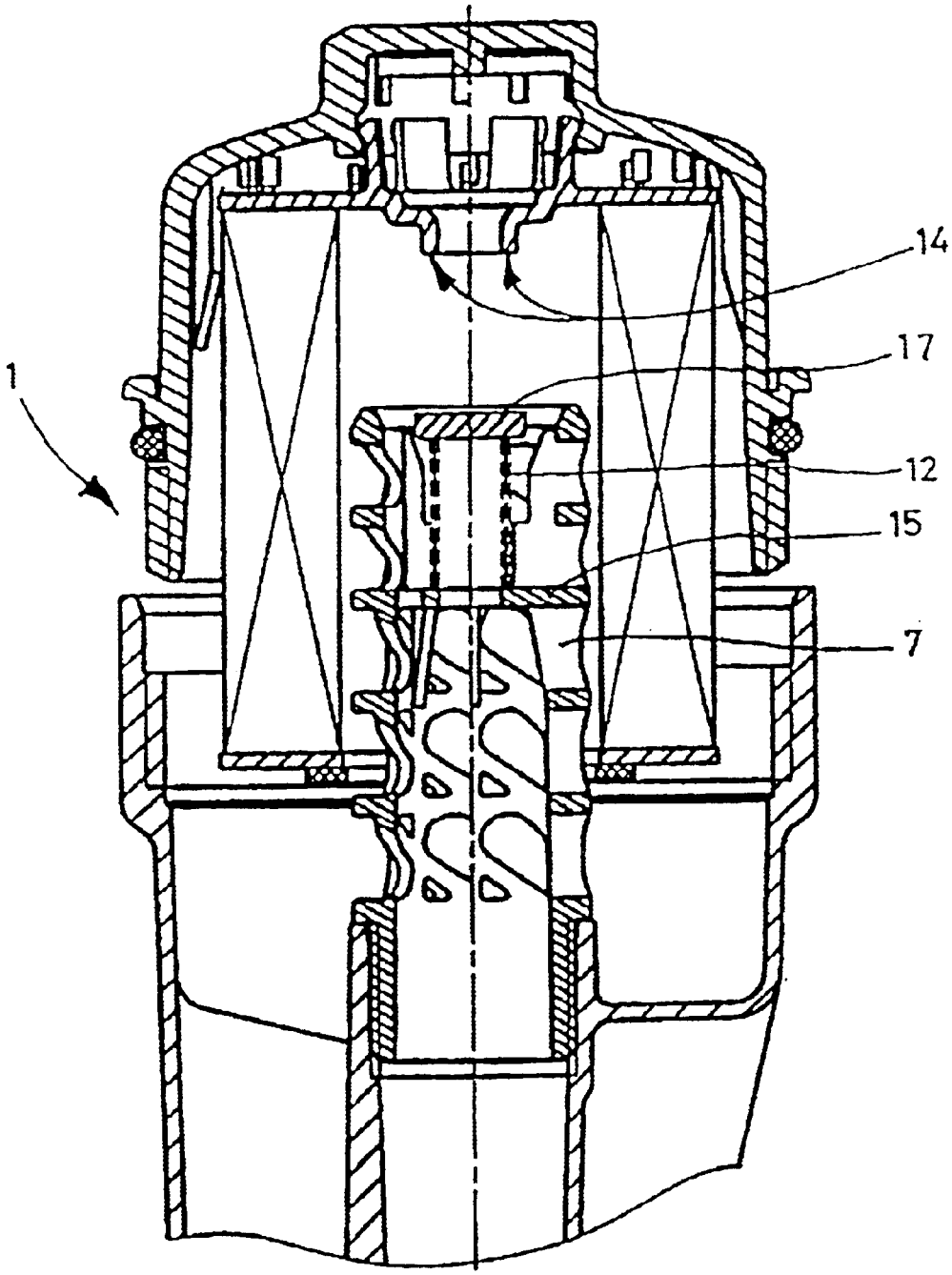
FIG. 3 is a third embodiment in a system similar to FIG. 2.

FIG. 3 shows a fluid filter 1 in which the filter bypass valve has a valve body designed as plate 17. Plate 17 is permanently connected with spring 12, with spring 12 likewise being connected permanently to supporting plate 15 of supporting dome 7, since the valve-integral arrangement of the valve body in this embodiment is not produced by retaining claws in the form of barbs.

In a version of this embodiment with a convexly bent sealing end of the valve body or with a flat valve body made in the form of a plate, provision can be made, especially in the design of upper end disk 5 with an area that is drawn inward and serves as a support as in the three embodiments shown, to provide the valve body with a collar-like or funnel-shaped upper end abutting sealing surface 14 and gripping the latter externally.

The idea of the invention, not to have the parts required for the filter bypass valve always assembled, but to make one part integral with the filter and another part on the interchangeable filter element, can also be implemented by reversing these embodiments and providing the valve body as a filter element and making the sealing surface facing the valve body integral with the filter. This results in a comparatively expensive design for the fluid filter, however, since the sealing body must always be replaced along with the filter element and consequently represents a part that is subject to wear.

*According to one embodiment of the invention, a method of providing a fluid filter for an engine includes a step of disposing a replaceable filter element within a housing. The filter element has first and second ends and a filtering surface positioned therebetween. Another step of the method provides a filter bypass valve having a valve body within the housing. The valve body is adapted to move between a closed position where the valve body sealingly engages a sealing surface and an open position where the valve body permits fluid flow to bypass the filter element. The first end*

*of the filter element is provided with a sealing surface for the valve body. In this embodiment, the disposing step engages the valve body with the sealing surface. According to this embodiment, if the filter element were removed from the housing, the sealing surface is adapted to remain with the filter element.*

*The method may optionally include the step of mounting a support dome within the housing. In such a case, the dome extends along a longitudinal axis, and the valve body is positioned within the support dome for movement along the longitudinal axis between the closed and open positions. Optionally, a further step may include guiding the valve body along the longitudinal axis of the support dome between the closed position and the open position.*

*The method may alternatively optionally include the step of configuring the first end of the filter element as an annular disk.*

*Furthermore, the method may alternatively optionally include the step of biasing the valve body into the closed position.*

*According to another embodiment of the invention a method is provided for removing and replacing a filter element suitable for use with a fluid filter of an engine. In this method, the fluid filter has a housing, a dome coupled to the housing for supporting the filter element, and a filter bypass valve. The filter bypass valve is disposed within the housing and has a valve body secured to the support dome. The valve body is movable against the action of a resistance element mounted between the valve body and the support dome. The valve body is disposed between a closed position where the valve body engages a sealing surface to form a fluid tight seal and an open position where the valve body disengages the sealing surface to permit fluid to bypass the filter element. The method includes the step of removing the filter element from the fluid filter such that the sealing surface is separated from the valve body. Another step of the method involves positioning the filter element to engage the valve body such that an end plate of the filter element forms the sealing surface.*

*According to another embodiment of the invention, a filter element is provided to be suitable for use with a fluid filter of an engine, the fluid filter having a housing, a dome coupled to the housing for supporting the filter element, and a filter bypass valve disposed within the housing and having a valve body secured to the support dome. The valve body is movable against the action of a resistance element mounted between the valve body and the support dome, wherein the valve body is disposed between a closed position where the valve body engages a sealing surface of a valve seat to form a fluid tight seal and an open position where the valve body disengages the sealing surface to permit fluid to bypass the filter element. The filter element includes a lower end disk, an upper end disk having a tubular portion defining an open middle area. The tubular portion extends toward the lower end disk and terminates at a free end. A filter surface is disposed between the lower end disk and upper end disk, wherein the free end of the tubular portion forms the valve seat having the sealing surface positioned and adapted to engage, in use, the valve body. The upper end disk 5 has a housing engaging surface co-located with the tubular portion in the form of a circumferential, radially inwardly-facing rib 5b arranged around the tubular portion and wherein the filter element is adapted to be removably and replaceably mounted within the housing.*

*According to a further embodiment of the invention, the upper end disk 5 has a housing engaging surface 5c in the form of upwardly extending clips formed on the upper end disk 5 and wherein the filter element is adapted to be removably and replaceably mounted within the housing.*

I claim:

1. A fluid filter, comprising a housing, a replaceable filter element positioned within said housing, said filter element including first and second ends and a filtering surface positioned therebetween, and a filter bypass valve including a valve body, mounting means for integrally mounting said valve body within said housing so as to remain mounted within said housing when the replaceable filter is replaced, said valve body being movable between a closed position, in which said valve body sealingly engages a sealing surface, and an open position in which said valve body permits fluid flow to bypass said filter element, wherein said first end of said filter element forms said sealing surface for said valve body.

2. The fluid filter of claim 1, further comprising a support dome fixed within said housing and extending along a longitudinal axis, said valve body being positioned within said support dome for movement along the longitudinal axis of said support dome between said closed position and said open position.

3. The fluid filter of claim 2, wherein said filter element has an annular shape and is positioned to surround said support dome.

4. The fluid filter of claim 3 wherein said first end of said filter element is an annular disk which forms said sealing surface for said valve body.

5. The fluid filter of claim 2, wherein said support dome includes guide means for guiding said valve body along the longitudinal axis of said support dome between said closed position and said open position.

6. The fluid filter of claim 5, wherein said valve body further comprises an elongated shaft which is guided by said guide means along the longitudinal axis of the support dome, and wherein said first end includes an end portion which is sealingly engagable with said sealing surface when said valve body is disposed in said closed position.

7. The fluid filter of claim 6, wherein said end portion is a flat plate.

8. The fluid filter of claim 6, wherein said end portion is convexly round in shape.

9. The fluid filter of claim 6, wherein said filter bypass valve further comprises means for biasing said valve body into said closed position.

10. The fluid filter of claim 9, wherein said guide means comprises an annular guide plate through which said elongated shaft is guided, said biasing means being positioned between said guide plate and said end portion of said valve body.

11. The fluid filter of claim 9, wherein said shaft of said valve body comprises one or more resilient tongues having retaining claws for engaging said guide means.

12. A fluid filter for an engine, comprising a carrier engagable with the engine, a removable lid matable with said carrier, a support dome attached to said carrier and extending along a longitudinal axis, a replaceable filter element positioned around said support dome, said filter element including first and second ends and a filtering surface positioned therebetween, and a filter bypass valve including a valve body, mounting means for integrally mounting said valve body within said support dome such that said valve body remains mounted within the support dome when the replaceable filter element is replaced and movable between a closed position, in which said valve body sealingly engages a sealing surface, and an open position in which said valve body permits fluid flow to bypass said filter element, said valve body being positioned within said support dome for movement along the longitudinal axis of said support dome between said closed position and said open position, wherein said first end of said filter element is separable from said lid and forms said sealing surface for said valve body, and whereby removal of said lid from said carrier permits said filter element and thus said sealing surface to be removed from the carrier and support dome attached thereto.

13. The fluid filter of claim 12, wherein said filter element has an annular shape and is configured to surround said support dome.

14. The fluid filter of claim 13, wherein said first end of said filter element comprises an annular disk which forms said sealing surface for said valve body.

15. The fluid filter of claim 12, wherein said support dome comprises guide means for guiding said valve body along the longitudinal axis of said support dome between said closed position and said open position.

16. The fluid filter of claim 15, wherein said valve body comprises an elongated shaft which is guided by said guide means along the longitudinal axis of the support dome, and an end portion which is sealingly engagable with said sealing surface when said valve body is disposed in said closed position.

17. The fluid filter of claim 16, wherein said end portion is convexly round in shape.

18. The fluid filter of claim 16, wherein said filter bypass valve further comprises means for biasing said valve body into said closed position.

19. The fluid filter of claim 18, wherein said guide means comprises an annular supporting plate through which said shaft is guided, said biasing means being positioned between said guide plate and said end portion of said valve body.

20. The fluid filter of claim 19, wherein said supporting plate is reinforced along its inner edge.

21. The fluid filter of claim 20, wherein said supporting plate comprises a flange formed along its inner edge.

22. The fluid filter of claim 18, wherein said shaft of said valve body comprises one or more resilient tongues having retaining claws, said retaining claws engaging said supporting plate to maintain said valve body within said support dome when said filter element is removed from the fluid filter.

23. The fluid filter of claim 12, wherein said filter element is removably attached to said lid such that removal of said lid from said carrier removes said filter element from the fluid filter.

*24. A filter element suitable for use with a fluid filter of an engine, the fluid filter having a housing, a dome coupled to the housing for supporting the filter element, and a filter bypass valve disposed within the housing and having a valve body secured to the support dome, the valve body being movable against the action of a resistance element mounted between said valve body and said support dome wherein said valve body is disposed between a closed position where the valve body engages a sealing surface of a valve seat to form a fluid tight seal and an open position where the valve body disengages the sealing surface to permit fluid to bypass the filter element, wherein the filter element comprises a lower end disk, an upper end disk having a tubular portion defining an open middle area, wherein said tubular portion extends toward the lower end disk and terminates at a free end, an annular filter media disposed between the lower end disk and upper end disk, wherein said free end of said tubular portion forms said valve seat having said sealing surface positioned and adapted to engage, in use, the valve body, and wherein the filter element is adapted to be removably and replaceably mounted within the housing and excludes any tubular support members non-removably positioned within the annular filter media and between the upper and lower end disks.*

*25. A filter element according to claim 24, further comprising a recess in said filter element for seating the dome.*

*26. A filter element according to claim 24, wherein said valve seat has a concave shape for sealing with a convexly rounded surface of said valve body.*

*27. A filter element according to claim 24, wherein said valve seat has a flat shape for sealing with a flat surface of said valve body.*

*28. A method of providing a fluid filter for an engine, comprising the steps of*

*disposing a replaceable filter element within a housing, said filter element having first and second ends and a filtering surface positioned therebetween,*

*providing a filter bypass valve having a valve body within the housing, the valve body adapted to remain within the housing when the filter element is removed from the housing,*

*the valve body adapted to move between a closed position where the valve body sealingly engages a sealing surface, and an open position where the valve body permits fluid flow to bypass the filter element, and*

*providing said first end of said filter element with said sealing surface for said valve body and said valve body engages said sealing surface by said step of disposing such that said sealing surface is adapted to remain with said filter element when said filter element is removed from said housing.*

*29. The method of claim 28, further comprising the step of mounting a support dome within the housing, the dome extending along a longitudinal axis, wherein the valve body is positioned within the support dome for movement along the longitudinal axis between the closed and open positions.*

*30. The method of claim 29, further comprising the step of guiding the valve body along the longitudinal axis of the support dome between the closed position and the open position.*

*31. The method of claim 28, further comprising the step of configuring the first end of the filter element as an annular disk.*

*32. The method of claim 28, further comprising the step of biasing the valve body into the closed position.*

*33. A method of removing and replacing a filter element suitable for use with a fluid filter of an engine, the fluid filter having a housing, a dome coupled to the housing for supporting the filter element, and a filter bypass valve disposed within the housing and having a valve body secured to the support dome, the valve body being movable against the action of a resistance element mounted between said valve body and said support dome wherein said valve body is disposed between a closed position where the valve body engages a sealing surface to form a fluid tight seal and an open position where the valve body disengages the sealing surface to permit fluid to bypass the filter element, the method comprising the steps of*

*removing said filter element from said fluid filter such that said sealing surface is separated from said valve body, and*

*positioning the filter element to engage the valve body such that an end plate of the filter element forms the sealing surface.*

*34. A filter element suitable for use with a fluid filter of an engine, the fluid filter having a housing, a dome coupled to the housing for supporting the filter element, and a filter bypass valve disposed within the housing and having a valve body secured to the support dome, the valve body being movable against the action of a resistance element mounted between said valve body and said support dome wherein said valve body is disposed between a closed position where the valve body engages a sealing surface of a valve seat to form a fluid tight seal and an open position where the valve body disengages the sealing surface to permit fluid to bypass the filter element, wherein the filter element comprises a lower end disk, an upper end disk having a tubular portion defining an open middle area, wherein said tubular portion extends toward the lower end disk and terminates at a free end, a filter surface disposed between the lower end disk and upper end disk, wherein said free end of said tubular portion forms said valve seat having said sealing surface positioned and adapted to engage, in use, the valve body, said upper end disk having a housing engaging surface co-located with said tubular portion in the form of a circumferential, radially inwardly-facing rib arranged around said tubular portion and wherein the filter element is adapted to be removably and replaceably mounted within the housing.*

*35. A filter element suitable for use with a fluid filter of an engine, the fluid filter having a housing, a dome coupled to the housing for supporting the filter element, and a filter bypass valve disposed within the housing and having a valve body secured to the support dome, the valve body being movable against the action of a resistance element mounted between said valve body and said support dome wherein said valve body is disposed between a closed position where the valve body engages a sealing surface of a valve seat to form a fluid tight seal and an open position where the valve body disengages the sealing surface to permit fluid to bypass the filter element, wherein the filter element comprises a lower end disk, an upper end disk having a tubular portion defining an open middle area, wherein said tubular portion extends toward the lower end disk and terminates at a free end, a filter surface disposed between the lower end disk and upper end disk, wherein said free end of said tubular portion forms said valve seat having said sealing surface positioned and adapted to engage, in use, the valve body, said upper end disk having a housing engaging surface in the form of upwardly extending clips formed on the upper end disk and wherein the filter element is adapted to be removably and replaceably mounted within the housing.*

* * * * *